United States Patent [19]

Todd

[11] Patent Number: 4,708,370
[45] Date of Patent: Nov. 24, 1987

[54] RECREATIONAL VEHICLE DISCHARGE PIPE COUPLER

[75] Inventor: Harry V. Todd, El Cajon, Calif.

[73] Assignee: Toddco, El Cajon, Calif.

[21] Appl. No.: 875,451

[22] Filed: Jun. 17, 1986

Related U.S. Application Data

[63] Continuation-in-part of Ser. No. 855,924, Apr. 25, 1986, which is a continuation-in-part of Ser. No. 800,171, Nov. 14, 1985, Pat. No. 4,660,860.

[51] Int. Cl.$^4$ .............................................. F16L 25/00
[52] U.S. Cl. ...................................... 285/12; 285/175; 285/177; 285/7; 285/361; 285/396; 285/402; 285/903; 277/207 A
[58] Field of Search .................. 285/12, 177, 176, 175, 285/903, 7, 396, 402, 272, 275, 361; 137/344, 355.16; 277/207 R, 207 A, 214

[56] References Cited

U.S. PATENT DOCUMENTS

| | | | |
|---|---|---|---|
| 2,736,265 | 2/1956 | Higgins | 277/207 A X |
| 3,712,331 | 1/1973 | Otto | 137/355.16 |
| 3,811,462 | 5/1974 | Feliz | 137/355.16 X |
| 4,133,347 | 1/1979 | Mercer | 285/402 X |

FOREIGN PATENT DOCUMENTS 883687 7/1953 Fed. Rep. of Germany ...... 285/903

*Primary Examiner*—Richard J. Scanlan, Jr.
*Attorney, Agent, or Firm*—Bernard L. Kleinke

[57] ABSTRACT

A device is disclosed for coupling a drainpipe to a recreational vehicle discharge pipe fitting of the type having a terminal end portion with circular periphery and a plurality of locking pins extending outward radially from the periphery. The device employs a tubular member having a proximal end and a distal end. A drainpipe end portion of the tubular member terminating at the distal end has a complementary shape and size adapted to engage threadably an end of a corrugated drainpipe, while a fitting end portion of the tubular member terminating at the proximal end has a complementary shape and size adapted to engage telescopically a terminal end portion of the discharge pipe fitting. Open elongated slots in the fitting end portion receive the locking pins as the fitting end portion is placed over the terminal end portion of the discharge pipe fitting and rotated about its axis, each slot extending circumferentially toward the distal end of the tubular member from an open end portion of the slot at the proximal end to a closed end portion of the slot set back from the proximal end. Elongated portions of the fitting end portion disposed between the proximal end and respective ones of the slots engage respective ones of the locking pins, and a detent in each elongated portion receives the locking pin in locking engagement.

23 Claims, 7 Drawing Figures

U.S. Patent  Nov. 24, 1987  Sheet 1 of 3  4,708,370
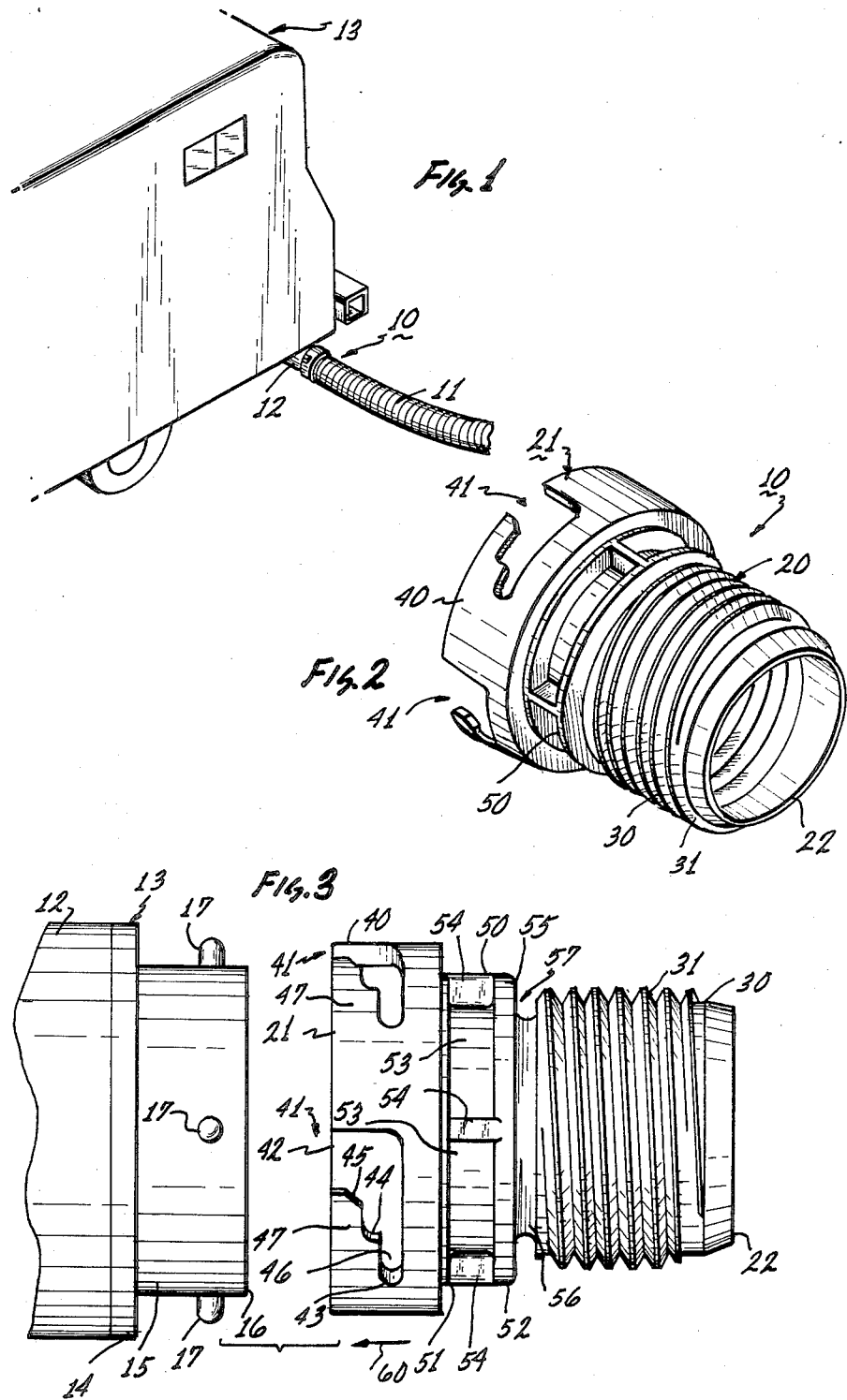

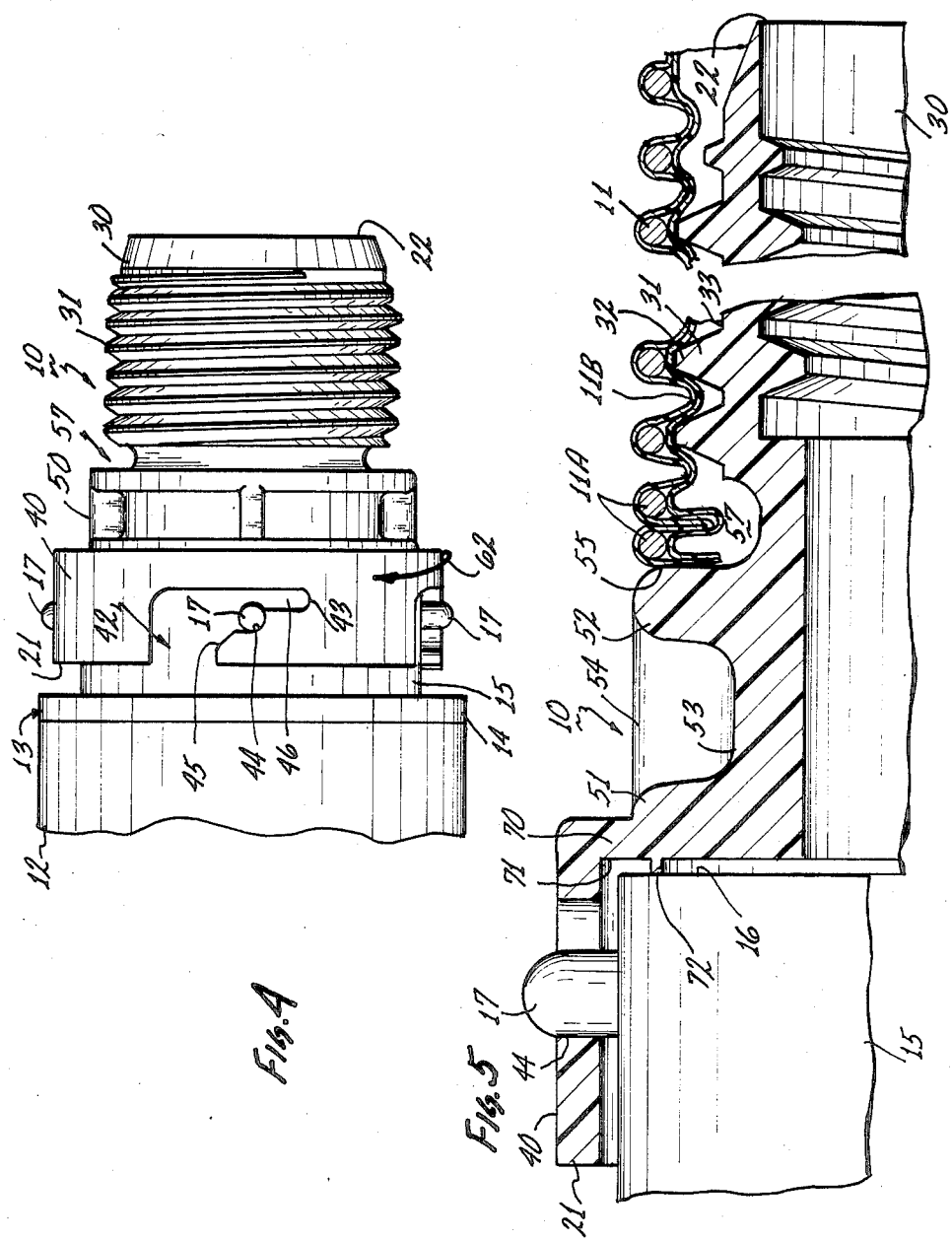

RECREATIONAL VEHICLE DISCHARGE PIPE COUPLER

CROSS-REFERENCES TO RELATED APPLICATIONS

This application is a continuation-in-part of copending U.S. patent application Ser. No. 855,924, filed Apr. 25, 1986, which is a continuation-in-part of copending U.S. patent application Ser. No. 800,171, filed Nov. 14, 1985, now U.S. Pat. No. 4,660,860.

BACKGROUND OF THE INVENTION

1. Technical Field.

This invention relates generally to recreational vehicle waste discharge flexible pipe adapters, and it more particularly relates to an adapter for coupling in fluid communication a flexible corrugated drainpipe and a recreational vehicle discharge pipe fitting.

2. Background Art.

Connecting drainpipe to a conventional recreational vehicle discharge pipe fitting does requires considerable unwanted and undesirable effort. Commonly employed flexible drainpipe includes a coiled spring imbedded within a plastic casing, which follows the helical outline of the coiled spring to cause the drainpipe to assume a corrugated shape. Such a drainpipe can have a diameter of approximately three inches, to provide adequate drainage under the flow of gravity, for most recreational vehicle requirements.

The recreational vehicle discharge pipe typically terminates at an outlet end at the exterior of the vehicle. The outlet end includes a discharge pipe fitting to which the drainpipe is coupled in fluid communication. The coupling of a drainpipe to the discharge pipe fitting is often accomplished by forcing the drainpipe onto or into the outlet end of the discharge pipe by extremely awkward manual manipulations, since the end of the discharge pipe is not constructed to receive the end of the commonly-used flexible drainpipe.

A very novel discharge pipe adapter that overcomes many of these problems is described in the foregoing copending patent application Ser. No. 855,924. The adapter employs a tubular member having a helically-shaped thread extending along one end for fast threadable engagement with the corrugations of corrugated drainpipe. The opposite end includes a plurality of spaced, open angular slots which receive a pair outwardly radially projecting pins on the discharge pipe fitting, to enable quick release or assembly in a latched manner onto and off to the end of the discharge pipe.

Although such adapter is highly effective and satisfactory in many respects, in some applications, such adapter may not securely assemble to the pipe fitting. For example, the pins on different discharge pipe fittings are often in different locations on the outlet end of the discharge pipe. In addition, the pins are oftentimes slightly misaligned, varying somewhat in their position relative to the terminal end of the fitting. This inhibits positive engagement with each one of the pins within the corresponding angular slots of the adapter. Furthermore, the smooth plastic composition employed in such an adapter, increases the tendency for dislodgement, so that joint integrity may be jeopardized in certain situations.

Consequently, it is desirable to have a new and improved adapter, which overcomes the problem of less than a secure engagement of the discharge pipe fitting with the adapter in certain applications.

A related problem concerns the sealing of the adapter to the terminal end of the discharge pipe fitting. Existing adapters often result in an inadequate seal so that waste can leak from the adapter at a location close to the recreational vehicle. Consequently, it is desirable to have an adapter, which provides better sealing engagement with the discharge pipe fitting.

In addition, it is desirable to have an adapter, which is easily gripped, so that it can be threadably onto the corrugated drain pipe, conveniently by hand, as well as being inexpensive to manufacture.

There have been many different types and kinds of couplers and adapters designed for similar purposes. Refer, for example, to U.S. Pat. Nos. 3,408,091; 3,471,179; 3,493,251; 3,899,198; 4,017,103; 4,133,347; 4,222,594; 4,368,904; 4,480,855; and 4,542,922. However, none of the foregoing patents disclose devices capable of adequately solving the aforementioned problems.

SUMMARY OF THE INVENTION

Therefore, the principal object of the present invention is to provide a new and improved adapter for coupling a corrugated flexible drainpipe to a discharge pipe fitting, such as the one commonly employed on recreational vehicles, to connect or to disconnect the drainpipe in fluid communication with the discharge pipe in a quick and facile manner.

It is a further object of the present invention to provide such a new and improved adapter, which is easy and convenient to install, while providing positive locking engagement of the discharge pipe fitting to produce a joint of substantial mechanical strength.

Yet another object of the present invention is to provide such an adapter, which can be readily secured in tight sealing engagement with the terminal end of the discharge pipe fitting, to prevent, or to inhibit greatly, the possibility of possible leakage close to the recreational vehicle.

Briefly, the above and further objects of the present invention are realized by providing an adapter for coupling in fluid communication with a drainpipe for a recreational vehicle discharge pipe fitting of the type having a terminal end portion with a circular periphery and a plurality of locking pins extending outwardly radially from the periphery thereof.

The device employs a tubular member having a proximal end and a distal end. A drainpipe end portion of the tubular member terminating at a distal end, has a complementary shape and size adapted to engage threadably with an end of a corrugated drainpipe. A fitting end portion of the tubular member terminates at the proximal end, and has a complementary shape and size adapted to engage telescopically the terminal end portion of the discharge pipe fitting.

Open elongated slots in the fitting end portion of the adapter receive the locking pins, as the fitting end portion is attached to the terminal end portion of the discharge pipe fitting. In this regard, the adapter is rotated about its axis, and each slot extends circumferentially toward the distal end of the tubular member from an open end portion of the slot at the proximal end to a closed end portion of the slot. Elongated portions of the fitting end portion disposed between the proximal end and respective ones of the slots, engage respective ones of the locking pins. A detent portion in each elongated slot receives the pin in locking engagement therewith.

Thus, the adapter of this invention overcomes many problems associated with existing devices. It snaps onto a discharge pipe fitting with a positive locking action, despite locking pin misalignment. The adapter provides a mechanically secure, sealed joint, which is tighter, stronger, and far less prone to leakage and inopportune dislodgement.

BRIEF DESCRIPTION OF THE DRAWINGS

The above and other objects and features of this invention, and the manner of attaining them, will become apparent, and the invention itself will be best understood, by reference to the following description of an embodiment of the invention, taken in conjuction with the accompanying drawings.

FIG. 1 of the drawings is a pictorial, fragmentary view of a recreational vehicle discharge pipe adapter, which is constructed according to this invention;

FIG. 2 is an enlarged pictorial view of the adapter of FIG. 1;

FIG. 3 is an enlarged elevational view of the adapter of FIG. 1 showing it in position for connection to a discharge pipe fitting;

FIG. 4 is an enlarged eleveational view of the adapter of FIG. 1, illustrating it assembled to the discharge pipe fitting.

FIG. 5 is a greatly enlarged cross sectional fragmentary view of a portion of the adapter of FIG. 1, shown assembled to a discharge pipe fitting to illustrate relative component alignment;

DESCRIPTION OF THE PREFERRED EMBODIMENT

Figure 6:
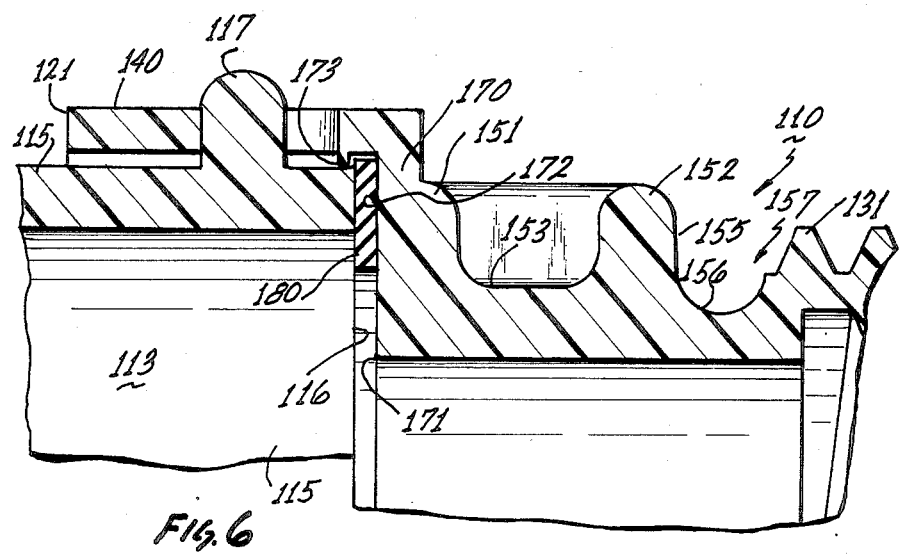
FIG. 6 is an enlarged cross fragmentary sectional view of a portion of another recreational vehicle discharge pipe adapter, which is also constructed according to the invention.

Referring now to the drawings, and particularly to FIG. 1 thereof, there is shown a recreational vehicle discharge pipe adapter 10, which is constructed in accordance with the present invention. The adapter 10 is shown assembled in place on a recreational vehicle 13, coupling the end of a flexible drainpipe 11 to a discharge pipe fitting on the end of discharge pipe 12, to interconnect it and the drainpipe in fluid communication.

The discharge pipe 12 provides an outlet from recreational vehicle 13 for waste removal purposes, and thus waste flows from the recreational vehicle 13 through the discharge pipe 12, the adapter 10, and the drainpipe 11 to a remotely located disposal site (not shown). By interconnecting the drainpipe 11 and the discharge pipe 12 end-to-end with the adapter 10, a flow path is thereby extended from the discharge pipe 12 to an inlet (not shown) of the remotely located site.

Referring now to FIGS. 2–4, the adapter 10 generally comprises a hollow tubular member 20 having a rear or proximal end 21 and a front or distal end 22. The tubular member 20 is generally circular throughout its axial length, and it is injection molded from a suitable thermoplastic material to the desired configuration.

The tubular member 20 includes an open drainpipe end portion 30 terminating at the distal end 22 and has a complementary shape and size adapted to engage threadably an end of the drainpipe 11. The drainpipe end portion 30 includes an exterior thread 31 for threaded engagement with the drainpipe 11. The thread 31 is helically shaped to conform to the corrugated contour of drainpipe 11.

The conventional drainpipe used with recreational vehicles typically employs a coiled, hardened steel spring, such as spring 11A in FIG. 5. The spring is embedded within a sheet plastic casing. This results in a thread-like contour to the corrugated drainpipe, thus enabling threaded engagement with the threads 31 of the adapter 10. Thus, by providing the adapter with a thread which mates with the helically corrugated casing of a conventional recreational vehicle drainpipe, drainpipe end portion 30 can be threaded into the drainpipe 11, as if the corrugations were threads designed for this purpose.

The tubular member 20 includes an open fitting end portion 40 terminating at the rear end 21, which has a complementary shape and size adapted to engage telescopically the conventional discharge pipe fitting 13 attached to the vehicle discharge pipe 12. A base portion 14 of the fitting is attached to the discharge pipe 12, and an outer end portion 15 extends to a terminal end 16 (FIG. 3). Four equally spaced apart locking pins 17 extend outward radially from the periphery of the fitting. The fitting end portion 40 of tubular member 20 has a shape and size adapted to engage telescopically the terminal end portion 15 of the fitting 13.

Four open-ended, elongated bayonet slots 41 are provided in the fitting end portion 40 for receiving the four locking pins 17 individually as the ftting end portion 40 is placed over the terminal end portion 15 in the direction of arrow 60 (FIG. 3), while simultaneously being rotated manually about its axis in the direction of the arrow 61 (FIG. 4). The slots 41 co-act with the locking pins 17 in this manner to secure the fitting end portion 41 to the terminal end portion 15 of the fitting 13.

The slots 41 are similar to one another, and each one extends circumferentially in the fitting periphery of the end portion 40 toward the distal end 22 of tubular member 20, from an open end portion 42 of the slot at the near end 21 (FIG. 3) to a closed end portion 43 of the slot positioned axially forwardly from the rear end. Four elongated portions or fingers 47 of the fitting end portion are disposed at the rear end 21 and define respective ones of the slots 41. The fingers 47 engage a respective one of the locking pins 17 when the adapter 10 is assembled to the fitting 13, with locking pins 17 being disposed within corresponding ones of the slots. Each one of the fingers 47 extends circumferentially from the open end 42 of the respective slot 41 to the closed end 43 of the respective slot.

Detent opening portions 44 are defined by the fingers 47, and are disposed intermediate the opened end portion 42 and the closed end portion 43 of the slot. The detent opening portions receive in locking engagement a respective one of the locking pins 17. The locking pins enter the corresponding slots as the adapter 10 is rotated manually about its longitudinal axis. The locking pins 17 snap into respective ones of the detent opening portions 44, to lock the adapter 10 in place on the fitting.

A cam portion 45 on each of the fingers 47 guide the locking pins into the slot. A relief portion 46 of the slot 41 enables the fingers 47 to flex slightly toward the rear end when abutting the locking pin 17. This action enables the adapter 10 to accommodate variances in locking pin positions. In this regard, the locking pins are often spaced from the terminal end of the fitting by different distances for any given fittings, due to variations in design, or even due to variations in tolerances. In addition, locking pins on the same fitting are often misaligned in the sense that they are not equally spaced from the terminal end. The resilient finger 47 accommodates such variances in locking pin position, and, at the same time, provides a positive pin locking engagement, whereby the pins snap into the detent portion of the slot.

As best seen in FIG. 4, each one of the slots 41 is generally L-shaped, having a short axial portion 41A starting at open portion 42, and along peripherally extending portion 41B terminating at the closed end portion 43. A relief portion 41C extends between the detent portion 44 and the closed end portion 43 to provide the finger 47 to a stiff, resiliency, so that it flexes slightly when it engages the locking pin 17, as shown in FIG. 4.

For the purpose of removing the adapter 10 from the fitting 13, a reverse sequence of manipulations can be quickly performed with ease in a simple quick release operation, even in the dark.

Intermediate the drainpipe end portion 30 and the fitting end portion of 40 is disposed an enlarged annular flange 50, which can be readily gripped to rotate the adapter, either onto or off of the fitting 13. The annular flange 50 can be gripped manually or with a tool such as a wrench (not shown).

The annular flange includes a first ring member 51, a second ring member 52, and a plurality of recessed portions 53 therebetween, segmented by four axially-extending ribs 54. This combination provides an irregular surface for enabling gripping engagement of the annular flange portion with the hand of the user. The recessed portions 53 have a size and shape adapted to receive the fingers of a user.

The annular flange also serves the purpose of sealing the drainpipe to the adapter 10. In this regard, as shown in FIG. 5, the annular flange includes a radially extending surface 55 facing distal end 22. A recessed portion 56 between the surface 55 and the rear end of the thread 31, defines a space 57 into which a portion of the drainpipe 11 is compressed when the adapter 10 is threaded into the drainpipe for sealing it to the adapter 10. Thus, leakage is prevented, or at least, minimized.

The drainpipe end portion 30 of the adapter 10 fits within the drainpipe 11. Thread 31 threadably engages the internal corrugations of the drainpipe 11 formed by the coiled spring 11A within casing 11B forming the flexible corrugated drainpipe 11. As the adapter 10 and drainpipe 11 are threaded together, the drainpipe abut surface 55, and the end portions 11A of the coiled spring compresses within space 57. Thus, several end coils, such as two to four, of the end coils 11A, fit within the space 57 and are pressed firmly and tightly against the surface 55, for sealing purposes.

Thread 31 is shaped and dimensioned to have a diameter at crest 32 slightly less than the inner diameter of spring 11A, and the diameter at root 33 of the thread is sufficient to enable the casing 11B to fit between crests 32 as illustrated.

As shown in FIG. 5, the fitting end portion 40 of the adapter 10 includes an annular interior surface 71 facing the rear end. When the fitting end portion is assembled to the discharge pipe fitting, the surface 71 is disposed adjacent the terminal end portion 15 of fitting 13, and an integral annular ridge 72 extending axially rearwardly from the surface 71 engages sealingly the terminal end portion 16 to provide a high-pressure-per-unit-area continuous annular line of engagement therewith. This results from the relative small surface area of the annular ridge 72 that contacts the terminal end portion 15 of the fitting. A generally fluid-tight seal between the adapter 10 and the fitting 13 is thus achieved. The ridge 72, being composed of suitable plastic material, deforms slightly to provide the seal.

An alternate form of the invention is illustrated in FIG. 6 where it is designated generally by reference numeral 110. For convenience, reference numerals are increased by 100 over those designating similar elements in FIGS. 1-5.

An adapter 110 is generally similar to the adapter 10, but it employs a separate gasket member 180, in the form of a resilient annular ring, positioned between surface 171 and terminal end 116 of terminal end portion 115, between ridge 172 and the terminal end. The gasket member 180 is composed of a suitable elastomeric material which is sufficiently compliant to conform to annular ridge 172 and terminal end 116, to provide generally fluid-tight sealing engagement. An inwardly-extending integral annular internal shoulder 173 on the interior of the coupler 110 adjacent the surface 155 retains the gasket member 180 in place. An annular groove 180A in the face of the member 180 receives the ridge 172 to fix the member 180 to the adapter 110.

Figure 7:
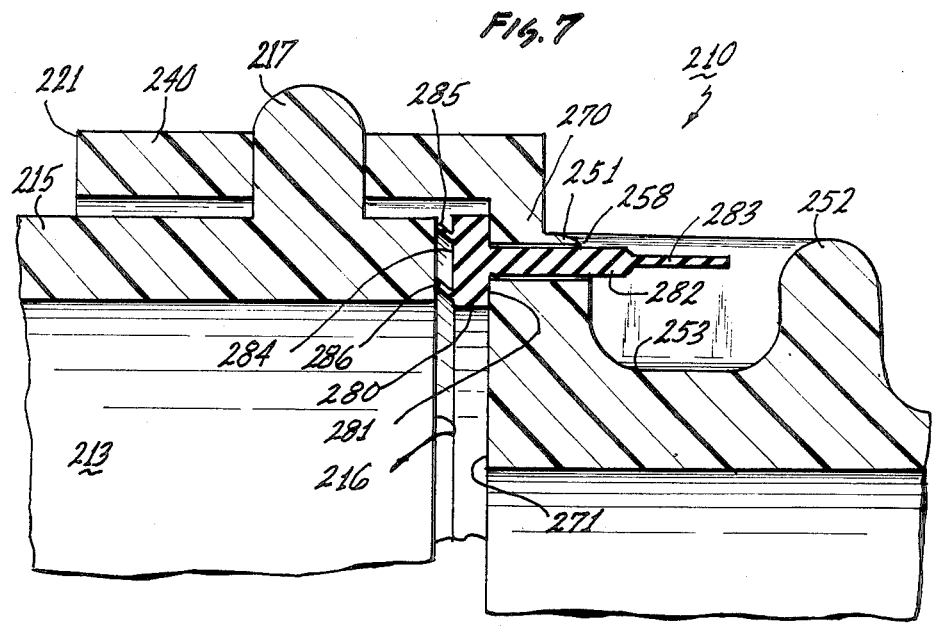
FIG. 7 is an enlarged fragmentary sectional view of still another recreational vehicle discharge pipe adapter, which is also constructed according to the invention.

Another arrangement for retaining the gasket in place is illustrated in FIG. 7. For illustrative convenience, reference numerals are increased by 100 over those designating similar elements in FIG. 6.

An adapter 210 is similar in construction to the adapters 10 and 110, and will not be described in detail. Like adapter 110, a resilient gasket member 280 is employed to seal a surface 271 of an annular shoulder 270 and a terminal end 216 of the fitting 213. Unlike adapter 110, however, an annular ridge is not employed in the annular shoulder to bear against the gasket. Instead, for sealing purposes, the gasket member 280 includes a pair of axially rearwardly extending annular ridges 285 and 286. The ridges deform or deflect to form the seal.

The gasket member 280 includes a second gasket surface 281 that abuts surface 271 of the annular shoulder. Four integrally-formed gasket fingers 282 extend outwardly from the second gasket surface at equal intervals around the gasket. These gasket fingers are shaped and dimensioned to fit snugly into four holes 258 formed at equal intervals in the annular shoulder 270. Holes 258 extend from the surface 271 through the ring member 251, and receive the gasket fingers 282 in a force fit to retain the gasket in position adjacent surface 271.

Each one of the fingers are identical to one another, and only one of them is illustrated. Each of the gasket fingers 282 has a necked down reduced diameter end portion 283, which is shaped and dimensioned to fit loosely through the holes 258. To assemble the gasket to the coupler 210, the end portions, such as the end portion 283, are threaded through the holes, such as the hole 258, so that they can be grasped with the fingers or a suitable tool such as a pliers, and pulled to seat an enlarged diameter shank portion 290 of the finger 282 tightly and frictionally in the hole. This achieves an inexpensively manufactured and easily assembled gasket attaching arrangement.

Thus, the adapter of this invention in its various forms, provides a significant improvement over prior known adapters. The adapter is easily assembled to the discharge pipe fitting where it provides a positive locking engagement of the locking pins and superior fluid-tight sealing engagement of the fitting. In addition, a section of corrugated drainpipe is easily threaded onto the drainpipe end portion to abut surface 55 to provide a seal between the adapter and the drainpipe.

Disassembly is equally convenient. The drainpipe is first disconnected from the adapter by backing the drainpipe threadably from the adapter. The adapter is then rotated off of the discharge pipe fitting. The adapter and drainpipe are transported by hand away from the vehicle for cleaning purposes, and then brought back to the vehicle for storage.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A device for coupling a drainpipe to a recreational vehicle discharge pipe fitting of the type having a terminal end portion with a circular periphery and a plurality of locking pins extending outward radially from the periphery of the vehicle discharge pipe fitting, comprising:

a tubular member having a proximal end and a distal end;

a drainpipe end portion of the tubular member terminating at the distal end, the drainpipe end portion having thread means and a complementary shape and size adapted to engage threadably an end of a helically corrugated drainpipe;

a fitting end portion of the tubular member terminating at the proximal end, the fitting end portion having a complementary shape and size adapted to engage telescopically a terminal end portion of the discharge pipe fitting;

said fitting end portion having an annular interior surface facing said terminal end portion of the discharge pipe fitting, when the discharge pipe fitting is assembled to said fitting end portion;

sealing means for providing a generally fluid-tight seal between said surface and the terminal end portion of the discharge pipe fitting;

slot means defining a plurality of open elongated slots in the fitting end portion for receiving respective ones of the locking pins as the fitting end portion is placed over the terminal end portion of the discharge pipe fitting and rotated about its axis, each slot extending circumferentially toward the distal end of the tubular member from an open end portion of the slot at the proximal end to a closed end portion of the slot set back from the proximal end, said slot defining means including a plurality of elongated portions of the fitting end portion disposed between the proximal end and respective ones of the slots for engaging a respective one of the locking pins;

said slot means including detent means defining a detent portion in each one of the elongated portions that is disposed intermediate the open end portion and the closed end portion of the slot, for receiving in locking engagement a respective one of the locking pins; and said slot defining means includes flexing means defining a relief portion of each one of the slots disposed at the closed end portion of the slot, for enabling the elongated portions to yield slightly when abutting the locking pins to accommodate variances in locking pin position, and for causing said sealing means to be drawn into tight engagement sealingly with the terminal end portion of the discharge pipe fitting.

2. The device recited in claim 1, wherein:
   said slot defining means include cam means defining a cam portion in each one of the elongated portions that is disposed intermediate proximal end and the detent portion, for guiding the locking pins into the slot.

3. The device recited in claim 1, wherein:
   the sealing means includes means defining an annular ridge on said surface for providing a high-pressure-per-unit-area continuous annular line of engagement with the terminal end portion of the discharge pipe fitting.

4. The device recited in claim 3, further comprising:
   gasket means defining an elastomeric gasket member to be placed between the annular ridge and the terminal end portion of discharge pipe fitting for providing a generally fluid-tight seal.

5. A device pursuant to claim 4, wherein said fitting end portion further comprises a radially inwardly extending integral internal annular shoulder portion, for retaining said gasket means in place.

6. A device pursuant to claim 5, wherein said gasket means further comprises a radially extending annular groove on its front face, for receiving said annular ridge.

7. The device recited in claim 1, further comprising:
   an annular flange portion of the tubular member disposed on the exterior of the tubular member intermediate the drainpipe end portion and the fitting end portion.

8. The device recited in claim 7, wherein:
   the annular flange includes gripping means defining an irregular surface for enabling gripping engagement of the annular flange portion with the hand of a user.

9. The device recited in claim 8, wherein:
   the gripping means includes a plurality of recessed portions disposed around the periphery of the annular flange, the recessed portion having a size and shape adapted to receive a portion of the fingers of a user.

10. The device recited in claim 8, wherein:
    the corrugated drainpipe includes a coiled spring contouring the outer periphery of the corrugated drainpipe; and
    the thread includes an outer land diameter that is slightly smaller than the inner diameter of the coiled spring within the corrugated drainpipe.

11. The device recited in claim 1, wherein said sealing means includes an annular ring of compliant composition having first and second generally parallel surfaces; and
    attachment means, including a plurality of integral elongated members of the annular ring extending at equally spaced-apart locations from said first surface, generally parallel to the central axis of said annular ring, each one of the elongated members having a size and shape adapted to fit forceably through a mating hole in the tubular member for attaching the annular ring to the tubular member.

12. A device for coupling a drainpipe to a recreational vehicle discharge pipe fitting of the type having a terminal end portion with a circular periphery and a plurality of locking pins extending outward radially from the periphery, comprising:

a tubular member of unitary construction, having a proximal end and a distal end;

a drainpipe end portion of the tubular member terminating at the distal end, the drainpipe end portion having thread means and a complementary shape and size adapted to engage threadably an end of a helically corrugated drainpipe;

a fitting end portion of the tubular member terminating at the proximal end, the fitting end portion having a complementary shape and size adapted to engage telescopically a terminal end portion of the discharge pipe fitting;

slot means defining a plurality of open elongated slots in the fitting end portion for receiving respective ones of the locking pins as the fitting end portion is placed over the terminal end portion of the discharge pipe fitting and rotated about its axis, each slot extending circumferentially toward the distal end of the tubular member from an open end portion of the slot at the proximal end to a closed end portion of the slot set back from the proximal end, said slot defining means including a plurality of elongated portions of the fitting end portion disposed between the proximal end and respective ones of the slots for engaging a respective one of the locking pins, each one of the elongated portions extending circumferentially from the open end of the respective slot to the closed end of the respective slot;

said slot means including detent means defining a detent portion in each one of the elongated portions that is disposed intermediate the open end portion and the closed end portion of the slot, for receiving in locking engagement a respective one of the locking pins;

an annular flange portion of the tubular member disposed on the exterior of the tubular member intermediate the drainpipe end portion and the fitting end portion;

said thread means defining said thread along the drainpipe end portion that conforms to the corrugations of said corrugated drainpipe for enabling threaded engagement of the drainpipe, said thread extending from the distal end of the drainpipe end portion to a point slightly spaced apart from the annular flange; and means defining a radially-aligned surface on the annular flange portion facing the drainpipe end portion for abutting in sealing engagement said corrugated drainpipe when screwed onto the drainpipe end portion.

13. A device as recited in claim 12, further including a recessed portion between said radially-aligned surface and the adjacent thread, for defining a space into which a portion of the drainpipe is compressed, when the device is threaded into the drainpipe for sealing it to the device.

14. A device for coupling a drainpipe to a recreational vehicle discharge pipe fitting of the type having a terminal end portion with a circular periphery and a plurality of locking pins extending outward radially from the periphery, comprising:

a tubular member having a proximal end and a distal end;

a drainpipe end portion of the tubular member terminating at the distal end, the drainpipe end portion having thread means and a complementary shape and size adapted to engage threadably an end of a helically corrugated drainpipe;

a fitting end portion of the tubular member terminating at the proximal end, the fitting end portion having a complementary shape and size adapted to engage telescopically a terminal end portion of the discharge pipe fitting;

slot means defining a plurality of open elongated slots in the fitting end portion for receiving respective ones of the locking pins as the fitting end portion is placed over the terminal end portion of the discharge pipe fitting and rotated about its axis, each slot extending circumferentially toward the distal end of the tubular member from an open end portion of the slot at the proximal end to a closed end portion of the slot set back from the proximal end, said slot defining means including a plurality of elongated portions of the fitting end portion disposed between the proximal end and respective ones of the slots for engaging a respective one of the locking pins, each one of the elongated portions extending circumferentially from the open end of the respective slot to the closed end of the respective slot;

said slot means including detent means defining a detent portion in each one of the elongated portions that is disposed intermediate the open end portion and the closed end portion of the slot, for receiving in locking engagement a respective one of the locking pins;

the sealing means includes means defining an annular ridge on said surface for providing a high-pressure-per-unit-area continuous annular line of engagement with the terminal end portion of the discharge pipe fitting;

gasket means defining an elastomeric gasket member to be placed between the annular ridge and the terminal end portion of discharge pipe fitting for providing a generally fluid-tight seal;

an annular ring of compliant composition having first and second generally parallel surface; and attachment means, including a plurality of integral elongated members of the annular ring extending at equally spaced-apart locations from one of the gasket surfaces generally parallel to the central axis of the gasket member, each one of the elongated members having a size and shape adapted to fit forceably through a mating hole in the tubular member for attaching the annular ring to the tubular member.

15. The device recited in claim 14, wherein the gasket member further comprises:

one or more integral annular ridges of the annular ring extending outwardly from the other one of the gasket surfaces for abutting the terminal end of the fitting in sealing engagement.

16. A gasket member for sealing a terminal end portion of a conduit, to an adapter having an annular interior surface facing the terminal end portion thereof, and having a plurality of axially-extending holes at the annular interior surface of the adapter, the gasket member comprising:

an annular ring of compliant composition having a first surface for overlying the annular interior surface;

said annular ring including attachment means adapted to mate securely and detachably with the annular interior surface, for connecting the conduit to the adapter;

said attachment means including a plurality of integral elongated fingers of compliant composition, extending axially therefrom, each one of said elongated fingers having a size and shape adapted to fit frictionally through the mating holes in the adapter, for attaching said annular ring to the adapter.

17. A gasket member according to claim 16, wherein each one of said fingers has a distal necked down reduced diameter end portion being shaped and dimensioned to fit loosely through said mating holes; and a proximate enlarged diameter shank portion for fitting tightly and frictionally in said mating holes, and for achieving a positive locking engagement of the gasket member to the adapter.

18. A gasket member according to claim 16, further including a second surface being generally parallel to said first surface; and at least one axially rearwardly extending annular ridge, of compliant composition for engaging the conduit, to provide a liquid-tight seal for the conduit.

19. A gasket member according to claim 16, wherein the gasket member has a unitary construction.

20. A gasket member according to claim 16, wherein the gasket member is composed of elastomeric material.

21. A gasket member according to claim 20, wherein the gasket member is composed of rubber.

22. A gasket member according to claim 18, further including a pair of axially extending annular ridges.

23. A gasket member of unitary construction for sealing a terminal end portion of a conduit to an adapter having an annular interior surface facing the terminal end portion thereof, the gasket member comprising:

an annular ring of compliant composition having a first and second generally parallel surfaces;

attachment means depending integrally from said first surface, for engaging securely, sealingly and releasably the annular interior surface of the adapter; and sealing means depending integrally from said second surface, for engaging sealingly the terminal end portion, when the conduit is assembled to the adapter.

* * * * *